United States Patent  
Chikawa et al.

[15] 3,666,791  
[45] *May 30, 1972

[54] PROCESS FOR THE PURIFICATION OF CRUDE BIS-($\beta$-HYDROXYETHYL) TEREPHTHALATE

[72] Inventors: Yataro Chikawa; Michiyuki Tokashiki; Nobuo Suzuki, all of Iwakuni, Japan

[73] Assignee: Teijin Limited, Osaka, Japan

[ * ] Notice: The portion of the term of this patent subsequent to Jan. 4, 1989, has been disclaimed.

[22] Filed: Feb. 24, 1970

[21] Appl. No.: 13,462

Related U.S. Application Data

[63] Continuation-in-part of Ser. No. 780,619, Dec. 3, 1968.

[52] U.S. Cl. ..................................................260/475 PR  
[51] Int. Cl. .....................................................C07c 69/82  
[58] Field of Search ...........................................260/475 PR

[56] References Cited

UNITED STATES PATENTS 3,487,100  12/1969  Arai et al. ...............................260/475

*Primary Examiner*—Lorraine A. Weinberger  
*Assistant Examiner*—E. Jane Skelly  
*Attorney*—Sherman and Shalloway

[57] ABSTRACT

A process is provided for the purification of crude bis-($\beta$-hydroxyethyl) terephthalate by crystallization. The crude bis-($\beta$-hydroxyethyl) terephthalate is homogeneously dissolved in a solvent at a temperature higher than the apparent melting point of the crude material in the solvent and at a concentration higher than the saturation solubility of the crude material in the solvent at such apparent melting point so as to prepare the heated solution, the heated solution being rapidly cooled from its heated temperature to an optional temperature lower than the apparent melting point so as to precipitate bis-($\beta$-hydroxyethyl) terephthalate from the heated solution as solids in other than a granular or lumpy state. The process is further characterized in that the crude bis-($\beta$-hydroxyethyl) terephthalate or crystallized bis-($\beta$-hydroxyethyl) terephthalate is contacted with hydrogen in the presence of a hydrogenation catalyst before, after, or both before and after the precipitation step in a state wherein the bis-($\beta$-hydroxyethyl) terephthalate is either in a molten form or in a state of dilution or dispersion in the solvent.

7 Claims, 1 Drawing Figure

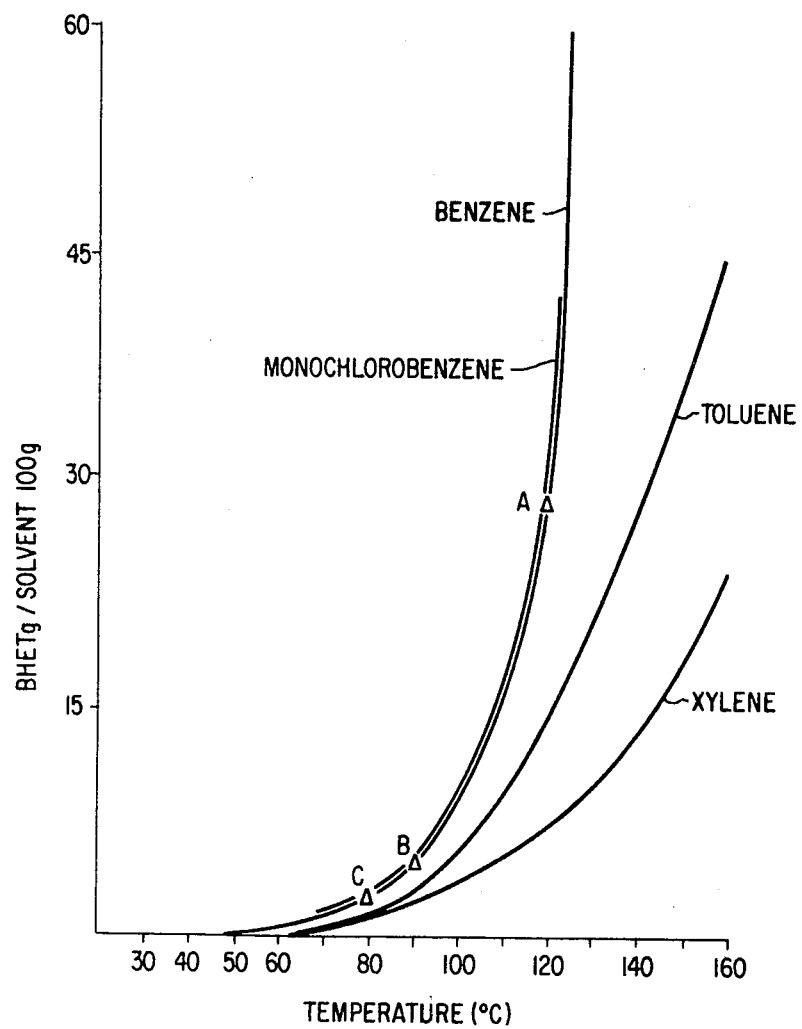

PROCESS FOR THE PURIFICATION OF CRUDE BIS-(β-HYDROXYETHYL) TEREPHTHALATE

This application is a continuation-in-part of U.S. application Ser. No. 780,619 filed Dec. 3, 1968, and directed to "Process for the Purification of Crude Bis-(β-hydroxy-ethyl) Terephthalate."

The present invention relates to a process for the purification of crude bis-(β-hydroxyethyl) terephthalate. More particularly, the present invention is directed to an improved process for the purification of crude bis-(β-hydroxyethyl) terephthalate involving crystallization.

In copending application Ser. No. 780,619 a process is disclosed for the purification of crude bis-(β-hydroxyethyl) terephthalate by crystallization, such process consisting of a. a first step wherein the crude bis-(β-hydroxyethyl) terephthalate is dissolved by heating in a solvent consisting of an aromatic compound which is liquid at room temperature;

b. a second step wherein the heated solution is cooled to precipitate the bis-(β-hydroxyethyl) terephthalate; and c. a third step wherein the precipitated bis-(β-hydroxyethyl) terephthalate is separated.

Such process is characterized in that in the first step (a) the solution is formed containing the crude bis-(β-hydroxyethyl) terephthalate uniformly dissolved in the solvent at a concentration higher than the saturation solubility of the crude bis-(β-hydroxyethyl) terephthalate in the solvent at a temperature corresponding to the apparent melting point of the crude bis-(β-hydroxyethyl) terephthalate in the solvent, as hereinafter defined, and at a temperature above the apparent melting point. In the second step (b) the solution is cooled at least from the temperature of the heated solution to an optional temperature below the aforesaid apparent melting point. This cooling is carried out rapidly so as to ensure that the bis-(β-hydroxyethyl) terephthalate is precipitated as solids other than of a granular or lumpy form, and thereafter the precipitated bis-(β-hydroxy-ethyl) terephthalate is separated.

Accordingly, the features of the invention disclosed in such copending application can be summarized as follows:

The solubility of crude bis-(β-hydroxyethyl) terephthalate (BHET) in aromatic compounds which are liquid at room temperature, such, for example, as benzene; toluene, xylene and monochlorobenzene, is relatively low at low temperatures but rapidly rises with an increase in temperature. For example, the solubilities of high purity BHET melting at 110° C in benzene, toluene, xylene and monochlorobenzene at various temperatures are as shown by means of their solubility curves in the graph of the accompanying FIGURE.

As can be seen from this graph, the solubility of BHET in these liquid aromatic compounds shows a rapid rise with rise of temperature. Therefore, when practicing the purification operation at high efficiency, it is advantageous to dissolve a maximum possible amount of the crude BHET in such aromatic compound solvents at a considerably high temperature of, for example, above 100° C and to cool this solution to the desired temperature such as room temperature or above, so that the maximum feasible quantity of purified BHET can be obtained by a single purification operation.

On the other hand, according to studies, the melting point of high purity BHET is 110° – 111° C, but the apparent melting point of the same BHET in a system in which an aromatic compound is present is lower than the foregoing temperature by about 5° – 20° C. For example, the apparent melting points of BHET in several typical aromatic compounds were confirmed to be as shown in Table I, below.

TABLE I

Melting Points of BHET in the Copresence of Various Aromatic Compounds (Solvents)

| Aromatic Compound | Apparent Melting Point of BHET (° C.) |
|---|---|
| benzene | 90–98 |
| toluene | 91–100 |
| xylene | 93–102 |
| monochlorobenzene | 90–98 |

Moreover, the apparent melting points of crude BHET containing a minor quantity of impurities, in the copresence of the aromatic compounds mentioned above, are still somewhat lower than the temperatures given in Table I, above.

The apparent melting point of BHET in an aromatic compound can be measured, for example, in the following manner. One gram of the sample BHET and 5 grams of the solvent (aromatic compound) are placed in a sealed tube and gradually heated in an oil bath. The temperature at which the sample BHET melts (the temperature at which two liquid phases are formed in the sealed tube) is measured and designated as the apparent melting point.

Thus, in the process of the aforedescribed copending application the purified BHET was obtained by (a) first preparing a heated solution of crude BHET containing the solute at a concentration higher than the saturation solubility of the crude BHET in the aromatic compound at the temperature corresponding to the apparent melting point of the crude BHET in said solvent, (b) followed by rapidly cooling the aforesaid heated solution at least from the foregoing temperature to an optional temperature lower than the apparent melting point of the crude BHET in said solvent to precipitate the BHET practically instantaneously, and (c) separating the resulting purified BHET. The purified BHET obtained was found to possess very high purity so that the polyethylene terephthalate obtained by polymerizing this BHET was completely free of discoloration, or if discolored, the discoloration was of such a degree as to be practically negligible. It was found also that this polyethylene terephthalate had a melting point comparable to, or even excelling, that of the conventional polyethylene terephthalate.

If, in the hereinabove described precipitation step, as in the customary crystallization technique, (a) the heated solution is gradually cooled, lumpy or granular BHET is precipitated. The purity of this lumpy or granular BHET is poor and contains a large amount of impurities, with the consequence that the polyethylene terephthalate obtained by polymerizing such a BHET is discolored with a yellow to brown color. Moreover, its melting point is also lower than that of the high purity polyethylene terephthalate by about 1° – 5° C.

However, when the heated solution of (a), above, is rapidly cooled to a temperature lower than the aforesaid apparent melting point, as noted in (b), above, BHET is precipitated as solids, consisting predominantly of scaly or acicular crystals, i. e., as solids other than of lumpy of granular form. BHET which has been precipitated without the admixture of granular or lumpy BHET as in this case contains very little impurities. Hence, it can be seen that high melting polyethylene terephthalate which is practically without discoloration can be polymerized from such a product.

Several modes of carrying out the foregoing rapid cooling operation will be described hereinafter with reference to the accompanying drawings.

1. A heated benzene solution of crude BHET of 120° C, as identified by point A in the figure, is formed in a pressure vessel, because the boiling point of benzene is 80° C. The rapid cooling of this solution to a temperature below the point B can be accomplished by the rapid release of the inside pressure of the pressure vessel to atmospheric pressure. The release of the pressure need not necessarily be to as low as atmospheric, however, but may be any as long as the temperature of the BHET slurry in benzene, which forms upon the release of pressure, is reduced to below the point B. In addition, the pressure may also be less than atmospheric.

2. As a second method, a large quantity of a cooled liquid or cooled slurry containing purified BHET can be introduced into the heated solution A to rapidly cool its temperature to below the point B.
3. Alternatively, the aforesaid heated solution may be introduced into a large quantity of cooled liquid or the foregoing slurry.

The cooled liquid or slurry to be used in the cooling methods (2) and (3), above, may be any that is not reactive with BHET. In consideration of such conveniences as ease of recovery and thermal economy, the same solvent as that of the heated solution, i. e., benzene in the case of heated solution A, or a slurry formed by the suspension of purified BHET in benzene is preferably used.

4. The rapid cooling method that is preferred in accordance with the present invention is one which is carried out in the following manner. The heated solution, e. g., heated solution A is discharged into a low pressure zone wherein the pressure is lower than the saturated vapor pressure of a mixture which is formed when the heated solution is cooled to the apparent melting point of the crude BHET in the solvent. As a result, the heated solution is rapidly cooled to an optional temperature below the apparent melting point. Thus, it becomes possible to accomplish by a simple operation the rapid cooling of the heated solution, i. e., in the case of the aforesaid heated solution A, to a temperature below the point B.

In method (4), above, the heated solution may be directly discharged into a vapor phase which is in a state of low pressure of below that such as specified above, or directly into a liquid phase which likewise is in such a low pressure state. The vapor phase may be air, an inert gas such as nitrogen or carbon dioxide, or a vapor of the solvent used. Again, as the liquid phase, any liquid which is inert to BHET is usable, but for the same reasons already mentioned, the same solvent as employed for the heated solution or a solution or suspension thereof containing BHET is preferred. The solvent may, of course, be cooled to a suitable temperature in advance. On the other hand, the low pressure zone may be under either superatmospheric, atmospheric or reduced pressure. In short, the essential requirement is that the pressure of the low pressure zone during the period of discharge thereinto of the heated solution be maintained at a level lower than the saturated vapor pressure of a mixture of the BHET and solvent of identical composition as the heated solution, which will form if the latter is cooled to the apparent melting point of the crude BHET in the solvent. By so doing, the heated solution A, for example, can be rapidly cooled from the point A, i. e., 120° C, to a temperature lower than the point B, i. e., approximately 90° C, to carry out the precipitation without causing the formation of granular or lumpy BHET. Further, the slurry obtained by discharging the heated solution into a low pressure zone such as described may be further cooled by other optional means, if desired.

It is also possible in the case of method (3), above, to easily obtain equally satisfactory results as with method (4), if the pressure under which the heated solution is mixed with the cooled liquid or slurry is either equal to or slightly higher than the saturated vapor pressure of a mixture of BHET and the solvent of identical composition, which would be set up when the heated solution is cooled to the apparent melting point of the crude BHET in the solvent.

After having accomplished the rapid cooling of the heated solution by any of the methods described in (1) – (4), above, it is advantageous to allow the cooled liquid to stand for 1 minute to 10 hours, and preferably 20 minutes to 3 hours to ensure that the BHET is fully precipitated, after which the precipitated BHET is separated from the solvent phase.

While the solvent to be used in the hereinabove described method of purifying BHET by crystallization, i. e., the aromatic compound which is liquid at room temperature, may be any solvent which is inert to BHET, those which demonstrate low dissolving ability of BHET at low temperature but high dissolving ability at higher temperatures, such as 100° C or above, and furthermore are thermally stable, are preferred. As such preferred aromatic compounds, aromatic hydrocarbons such, for example, as benzene, toluene, xylene (ortho-, meta- or para-), ethylbenzene, trimethylbenzene and cumene; and the halogenated aromatic hydrocarbons such, for example, as monochlorobenzene are exemplary. Of these, benzene and toluene, and particularly benzene are preferred.

In preparing the heated solution of crude BHET, the heating is preferably carried out at a temperature higher than the apparent melting point of said crude BHET in the solvent but below 200° C, and preferably below 180° C. The pressure is generally one which is not lower than the vapor pressure of the solvent at the heating temperature. On the other hand, while there is no particular restriction as to the drop in temperature during the operation of rapid cooling of the heated solution, this rapid drop in temperature should preferably be within the range 5° and 80° C. The process for the purification of BHET by crystallization, as disclosed in the hereinabove described copending application, yields purified BHET by a commercially very simple operation, but the so obtained purified BHET still contains small quantities of such impurities as HE–4CBA, HE–PTA and $\phi$-DEG.

The abbreviation HE–4CBA used above refers to a reaction product of 4-carboxybenzaldehyde and ethylene glycol or ethylene oxide, e. g., a compound of the formula

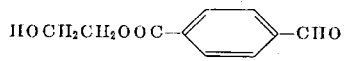

The abbreviation HE–PTA refers to a reaction product of p-toluic acid and ethylene glycol or ethylene oxide, for example, a compound of the formula

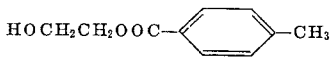

Additionally, $\phi$ = DEG stands for an adduct of BHET and ethylene glycol or ethylene oxide, for example, compounds of the formulae

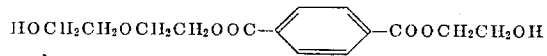
and
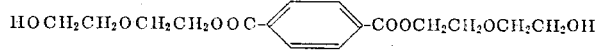

Of these impurities, HE–4CBA becomes particularly disadvantageous in that it causes discoloration of the polycondensed product, for example, polyethylene terephthalate. Accordingly, it is desired that the content of this impurity is held to a minimum.

According to the above described purification process by crystallization it is possible to transfer these impurities to the filtrate side and eliminate them from the precipitating BHET in a range as indicated by the distribution coefficient defined below.

$$\text{Distribution coefficient} = \frac{\text{Impurities concentration in the precipitated BHET}}{\text{Impurities concentration in the filtrate}}$$

(Note: The concentrations in the numerator and denominator are expressed by the same unit, for instance, gram/gram.)
This is below about 2.5 for HE–4CBA,
below about 1.0 for HE–PTA, and
below about 8 for $\phi$– DEG.

However, no matter under what conditions the foregoing purification process by crystallization is carried out, the distribution coefficient of HE–4CBA tends, in general, always to be greater than that of HE–PTA.

To obtain polyethylene terephthalate of the greatest possible whiteness with no discoloration by the polycondensation of BHET, it is desired that the HE–4CBA in the BHET be removed as completely as possible. Accordingly, with a view to achieving this end, further research concerning this purification process was conducted. This resulted in the improved process of the present invention.

Thus, according to the present invention, it becomes possible to produce bis($\beta$-hydroxyethyl) terephthalate (BHET) the content of the aforesaid impurities of which, and particularly HE–4CBA, is very small, by a process for the purification of BHET by crystallization which comprises dissolving crude BHET in a solvent consisting of aromatic compounds which are liquid at room temperature corresponding to the apparent melting point of the crude BHET in said solvent, as defined herein, and at a concentration higher than the saturation solubility of the crude BHET in the solvent at said apparent melting point to prepare a homogeneous heated solution of BHET; rapidly cooling the so obtained heated solution from the temperature at which it was heated to an optional temperature lower than said apparent melting point to precipitate said BHET as solids other than of granular or lumpy form; and thereafter separating the precipitated BHET; said improved process being characterized in that the precipitated BHET, in either its molten state or state of dissolution of dispersion in the aforesaid solvent or other optional inert liquid media, is contacted with hydrogen in the presence of a hydrogenation catalyst before, after, or both before and after the foregoing step of precipitating the BHET, whereby purified BHET is produced, the content of impurities of which, and particularly HE–4CBA, is exceedingly small.

Accordingly, it is a principal object of the present invention to provide an improved process for the purification of crude BHET by a crystallization method.

It is a further object of the present invention to provide such an improved process for the purification of crude BHET involving dissolving the crude material by heating in a solvent consisting of an aromatic compound which is liquid at room temperature, cooling the heated solution to precipitate the purified product, and separating the purified product, the process being characterized in that the precipitated product, in either its molten state or state of dissolution or dispersion in a solvent system or optional inert liquid, is contacted with hydrogen in the presence of a hydrogenation catalyst before, after, or both before and after the step of precipitation of the BHET.

It is still a further object of the novel process of the present invention to provide such a process wherein the same is characterized in that the heated solution is formed containing crude material uniformly dissolved in a solvent at a concentration higher than the saturation solubility of the crude material in the solvent at the temperature corresponding to the apparent melting point of the crude material and at a temperature above the apparent melting point.

It is a further object of the novel process of the present invention to provide such a process wherein the cooling step is characterized in that the heated solution is cooled rapidly to an optional temperature below the apparent melting point of the product so as to insure that the product is precipitated as solids of other than a granular or lumpy form.

Still further objects and advantages of the novel process of the present invention will become more apparent from the following more detailed description thereof.

As noted above, according to the present invention, the crude or precipitated BHET, before, after, or both before and after the step of rapidly cooling the heated solution of BHET to precipitate the BHET (hereinafter referred to as the crystallization step) is contacted either in its molten state or state of dissolution or dispersion in an optional inert liquid medium, with hydrogen in the presence of a hydrogenation catalyst. For convenience sake, this treatment will be referred to hereinafter as the hydrogenation treatment.

Such hydrogenation treatment of the present invention can, as shown below by way of example, be combined with the aforedescribed purification process by carrying out this treatment during various stages of the purification process.

1. Instances in which the hydrogenation treatment is carried out before the crystallization step.
    1–a. The hydrogenation treatment may be carried out on the crude BHET in its molten state, after which the aromatic solvent is added to prepare a heated solution of crude BHET, and thereafter this solution is submitted to the crystallization process.
    1–b. The crude BHET may be contacted with the aromatic solvent which is liquid at room temperature to prepare a heated solution of crude BHET, after which this heated solution is submitted to the hydrogenation treatment, and thereafter the solution is submitted to the crystallization process.
    1–c. The crude BHET may be contacted with the aromatic solvent at a temperature above the apparent melting point of the crude BHET to form a mixed liquid phase consisting of two liquid phases one of which is a solution phase predominantly of the aromatic solvent wherein a part of the crude BHET is dissolved and the other part of which is a molten phase predominantly of crude BHET wherein a part of the crude BHET is dissolved and the other of which is a molten phase predominantly of crude BHET wherein a part of the aromatic solvent is dissolved, after which the mixed liquid phase is submitted to hydrogenation treatment, and thereafter the solution phase and the molten phase are separated and the solution phase obtained is submitted to the crystallization process.
    1–d. The crude BHET and an inert liquid medium may be contacted at a temperature above the apparent melting point of the crude BHET to prepare either a heated solution of crude BHET of a liquid mixture consisting of the two liquid phases of a solution phase and a molten phase, after which this solution or liquid mixture is submitted to the hydrogenation treatment, and thereafter the BHET and said inert liquid medium are separated and the BHET obtained is submitted to the crystallization process.
2. Instances in which the hydrogenation treatment is carried out after the crystallization step.
    2–a. A slurry of an aromatic solvent and the BHET obtained after the crystallization step may be directly submitted to the hydrogenation treatment, after which the solid BHET is separated by filtration, and a part or the whole of the filtrate is recycled and reused as the solvent in a further cyrstallization process.
    2–b. A slurry of an aromatic solvent and the BHET obtained after the crystallization step may be filtered to separate the solid BHET, after which a part or the whole of the resulting filtrate (which contains crude BHET dissolved therein) is submitted to the hydrogenation treatment and a part or the whole of the so treated filtrate is recycled and reused as the solvent in a further crystallization process.
    2–c. A slurry of an aromatic solvent and the BHET obtained by carrying out the crystallization step may be filtered to separate a solid BHET, after which the so obtained solid BHET is melted by heating at above its apparent melting point, and thereafter the molten BHET is submitted to the hydrogenation treatment.
    2–d. A slurry of an aromatic solvent and the BHET obtained by carrying out the crystallization step may be filtered to separate a solid BHET, after which the so obtained solid BHET is contacted with an inert liquid medium at above the apparent melting point of the BHET to prepare either a heated solution of BHET or a two phase liquid mixture thereof composed of a solution phase and a molten phase, and thereafter the heated solution or two phase liquid mixture is submitted to the hydrogenation treatment followed by separation of the BHET from the inert liquid medium.

While the hydrogenation treatment according to this invention can be carried out by any of the hereinabove described methods of 1–a, 1–b, 1–c, 1–d, 2–a, 2–b, 2–c and 2–d in combination with the purification process by crystallization of the present invention, the methods in which the hydrogenation treatment is carried out before the crystallization step as in 1–a, 1–b, 1–c and 1–d are of greater advantage than those methods where the hydrogenation treatment is carried out after the crystallization step. The reason for this is that a major portion of the HE–4CBA contained in the crude BHET is converted to HE–PTA by carrying out the hydrogenation treatment before the crystallization step, with the consequence that when the crystallization step is carried out thereafter, the distribution coefficient of HE–PTA becomes an exceedingly small value of merely 1.0 or below. As previously noted, not only can the content of the HE–4CBA be reduced as compared with the instance where only the crystallization step has been carried out without performing the hydrogenation treatment, but also the total amount of HE–4CBA and HE–PTA can be reduced considerably. Further, of the treatments of 1–a, 1–b, 1–c and 1–d, the treatments of 1–a, 1–b and 1–c, and particularly the treatment of 1–a, are preferred according to the present invention. The reasons for this is that in the case of the treatment of 1–d where the hydrogenation treatment is carried out in an inert liquid medium different from the aromatic solvent used in the crystallization step, it becomes necessary first to separate and remove the inert liquid medium from the BHET after the hydrogenation treatment, thus involving an added operation requiring additional equipment and energy. Again, in the case of the treatment of 1–d where a liquid medium identical to that of the aromatic solvent used in the crystallization step is used, it is obvious that it is of greater advantage to carry out the hydrogenation treatment in accordance with the modes described in 1–b and 1–c.

On the other hand, in the case where the hydrogenation treatment is to be carried out after the crystallization step has been carried out, the mode of 2–c is particularly advantageous. The content of HE–4CBA in the resulting purified BHET can be readily reduced by operating in this manner. However, HE–PTA in the purified BHET is not reduced as much in this case as in the modes of 1–a, 1–b and 1–c. However, whereas HE–4CBA as a monofunctional compound not only functions as a reaction inhibitor of the polycondensation reaction of BHET but also becomes a cause of discoloration of the resulting polyethylene terephthalate, HE–PTA merely functions as a reaction inhibitor and does not become the cause of discoloration. Therefor, provided that the HE–PTA content of the BHET is less than about 2,000 ppm, the admixture of HE–PTA does not become a hindrance to the manufacture of high melting polyethylene terephthalate of satisfactory whiteness. Further, HE–PTA can be removed very effectively according to the purification process by crystallization alone. Accordingly, it is possible to obtain serviceable purified BHET even by means of the procedure of 2–c.

Furthermore, in carrying out the purification operation by crystallization, it is generally the practice in most cases for reducing the amount of solvent to be recovered and for enhancing the rate of recovery of the product, to recycle and reuse as the crystallization solvent a part of the filtrate obtained after separating the solid precipitate from the mother liquor by filtration. Since the HE–4CBA contained in the filtrate that is recycled can be reduced by carrying out the hydrogenation treatment as in 2–a and 2–b, there is the advantage that purified BHET whose HE–4CBA content is less can be obtained by the crystallization operation where the filtrate is recycled than in the case where the filtrate is not recycled.

When it is indicated that the crude BHET is in a molten state in the case of the treatments of 1–a and 2–c, above, it is not limited to the instance where the crude BHET alone is in a molten state but also includes the instance where either the crude or crystallized BHET is in a molten state while containing a small quantity of the aromatic solvent, which is liquid at room temperature, when the same is present in such an amount as not to form a separate phase.

Again, as the inert liquid media to be used in conducting the treatments of 1–d and 2–d, the aromatic compounds such as benzene, toluene, xylene and monochlorobenzene are preferred. It is particularly preferred to use one of these that is the same as that used in the crystallization step. However, other inert liquid media can be used, for example, alcohols such as ethanol, propanol and ethylene glycol; ketones, such as methyl ethyl ketone and methyl isobutyl ketone, ethers such as dioxane, chlorinated hydrocarbons, such as chloroform, methylene chloride and ethylene dichloride, and water.

While the temperature at which the hereinabove described hydrogenation treatment is carried out in the process of the present invention will vary depending upon the activity of the hydrogenation catalyst to be used, a temperature above that which is capable of substantially melting the crude BHET is suitable in the case where the treatment is to be carried out in a molten state. An excessively high temperature is not desirable, since decomposition and polycondensation reactions are initiated, or there is the danger of causing the hydrogenation reaction of the nucleus of the aromatic compound that may be contained in the BHET as a solvent. Furthermore, the melting temperature in this case will vary depending upon the class and amount of the impurities that are contained in the crude BHET, but generally the melting temperature is above 90° C. Therfore, when the hydrogenation treatment is to be carried out in the molten state, the melting temperature used ranges from 90° to 190° C, and preferably 100° to 150° C.

On the other hand, when the hydrogenation treatment of crude BHET is to be carried out in a solution or dispersion state using an aromatic compound at room temperature or other inert liquid media, any temperature may be used, provided that it is high enough that the charged BHET will be completely dissolved or dispersed in the liquid media used, and, on the other hand, low enough that no substantial decomposition or polycondensation reaction of the BHET is initiated. However, when the activity of the catalyst and the grade of the crude BHET which is to be purified are considered, a convenient temperature in this case is usually 20° – 250° C, and preferably 50° – 150° C.

The hydrogen to be used in the hydrogenation treatment of the invention process may either be substantially pure hydrogen or a hydrogen-containing gas, i. e., hydrogen diluted by means of an inert gas such as nitrogen, carbon dioxide, helium or argon. The use of such hydrogen in an amount sufficient to reduce the impurities contained in the crude BHET will do. Usually a small amount will suffice.

The contact of the hydrogen and BHET in the invention process may be accomplished either by the direct introduction of hydrogen into either the melt or the solution or dispersion of BHET, or by the substitution of a part or the whole of the atmosphere of the system by hydrogen. The pressure of the hydrogen may be either normal atmospheric or superatmospheric in this case. However, if the partial pressure of hydrogen is too high, there is the danger of a hydrogenation reaction being set up, depending upon the kind of solvent used. Therefore, the hydrogenation treatment is usually carried out at from normal atmospheric pressure to a pressure of 10 atmospheres.

As the hydrogenation catalyst to be used in the hydrogenation treatment, any of those which are usually used as hydrogenation catalysts may be utilized. Particularly, the catalysts having the ability to reduce the aldehyde group (— CHO) to the hydroxymethyl group (—CH$_2$OH) or methyl group (—CH$_3$) are preferably used. These include, for example, a catalyst of at least one metal selected from the group consisting of the metals of group VIII of the periodic system of elements, such as platinum, palladium, rhodium, ruthenium, iridium, osmium, cobalt, nickel and iron, and copper, silver, molybdenum, tungsten and rhenium, or the compounds of the foregoing metals which are capable of forming these metals under the hydrogenation conditions of the present invention. In addition, the copper-chromite catalyst can also be used in like manner.

Specific examples of the foregoing catalysts are given below.

a. Platinum type catalysts.
   Platinum black, platinum sponge, platinum oxide and colloidal platinum.
b. Palladium type catalysts.
   Palladium black, palladium sponge, palladium oxide, palladium-carbon and palladium hydroxide.
c. Rhodium type catalysts.
   Metallic rhodium, colloidal rhodium and rhodium hydroxide.
d. Ruthenium type catalysts.
   Metallic ruthenium, ruthenium hydroxide and ruthenium oxide.
e. Nickel type catalysts.
   Reduced nickel, Raney nickel, Stabilized nickel, Urushibara nickel, nickel formate and nickel sulfide.
f. Cobalt type catalysts.
   Reduced cobalt, Raney cobalt, Urushibara cobalt, cobalt formate, cobalt complex ion catalyst and a catalyst containing $[Co^{II}(CN)_5]^{3-}$ which is formed from cobalt chloride and potassium cyanide.
g. Copper type catalysts.
   Raney copper, copper oxides and copper halides.
h. Silver type catalysts.
   Metallic silver, silver oxide and silver halides.
i. Tungsten type catalysts.
   $WS_2$ and $WS_2$ - NiS-alumina.
j. Molybdenum type catalysts.
   Metallic molybdenum, molybdenum oxide and molybdenum sulfide.
k. Rhenium type catalysts.
   Metallic rhenium, rhenium sulfide, rhenium black and rhenium oxide-tetrahydropyran catalyst.

Of these mentioned above, preferred are the metals of group VIII of the periodic system of elements or the compounds thereof such as have been indicated in (a) – (f), above.

The foregoing hydrogenation catalysts may either be used as such or be used supported on a carrier such as active carbon, asbestos, diatomaceous earth, alumina or silica. Further, the foregoing hydrogenation catalysts may be used in either powder, pellet, aggregate or similar form.

While there is no particular restriction as to the amount in which these catalysts are used, a range on the order of 0.01 – 20 percent by weight, and preferably 0.05 – 10 percent by weight, calculated as the metal, based on the crude BHET is generally used. If necessary, the amount used can be further increased.

The hydrogenation catalyst may be used as a fixed, fluidized or moving bed, or as one in which the suspension technique is employed. Since the necessity of separating the catalyst after the hydrogenation treatment is obviated when the fixed bed technique is used, it is preferred. On the other hand, when the hydrogenation treatment has been carried out by the fluidized or moving bed or suspension technique, the catalyst is separated after completion of the hydrogenation treatment or after crystallization, as required. Again, it is possible to carry out the hydrogenation treatment by either the continuous or batchwise techniques.

Thus, it becomes possible according to the present invention by combining the purification process of recrystallization with a hydrogenation treatment to obtain, by a commercially very readily practicable operation, purified BHET the content of impurities of which, and especially the aldehyde type impurities such as the aforementioned HE–4CBA, is very small. Furthermore, the hydrogenation treatment is not only effective in reducing these aldehyde type impurities but is also effective in converting the other coloring matter or substances of similar nature contained in the BHET to colorless substances.

The crude BHET to be used as the starting material may be that obtained by any such reactions as, for example, the ester interchange of dimethyl terephthalate and ethylene glycol, the direct esterification of terephthalic acid and ethylene glycol, and the reaction of terephthalic acid with ethylene oxide. However, in the case of the crude BHET obtained by the reaction of terephthalic acid with ethylene oxide, since its oligomer content is low and its melting point is low, it is particularly suitable for applying the purification process of the present invention. This invention is particularly effective when applied to the purification of the crude BHET obtained by reacting ethylene oxide with a terephthalic acid prepared by the oxidation of paradialkylbenzene such as paraxylene. Again, while it is preferred that the crude BHET, after having been synthesized by the reactions previously noted, be separated from the unreacted terephthalic acid before being submitted to the purification operation of the present invention, the purification process can also be employed even though the crude BHET contains a small amount of unreacted terephthalic acid.

The following examples are given to further illustrate the present invention, it being understood that these examples are given in illustration and not to be construed as limiting the invention in any manner whatsoever. The parts and percentages in the examples are on a weight basis unless otherwise specified.

EXAMPLE 1 AND CONTROL 1

A slurry consisting of 83 parts of terephthalic acid prepared by the air oxidation of p-xylene in the liquid phase, 44 parts of ethylene oxide, 288 parts of benzene and 0.5 parts of triethylamine was continuously introduced by means of a plunger pump to a tubular reactor (a stainless steel pipe 4 mm in diameter and 140 m long) immersed in a water tank whose temperature was held at 180° C, at the rate of 10.56 parts per minute.

The reaction mixture was intermittently withdrawn via a 1.6 - liter intermediate tank whose pressure was regulated to 20 kg/cm² gauge, into a receiving tank whose temperature was held at 120° C and normal atmospheric pressure. At this time, the benzene evaporated was condensed by a condenser and withdrawn externally of the system. The molten BHET containing unreacted terephthalic acid, whose benzene content had been driven off as described above, was fed to a pressurized filter to separate the unreacted terephthalic acid, after which the reaction product was cooled and molded by means of a flaker to obtain flaky solid crude BHET.

The crude BHET prepared in this manner, upon analysis, contained 2,300 ppm of HE–4CBA, 1,020 ppm of HE–PTA, and its optical density (O.D.) was 0.256. This crude BHET was then melted by heating up to 110° C and delivered at the rate of 50 cc per minute by means of a plunger pump to the bottom of a catalyst-packed reactor held at normal pressure. The reactor, which was a tube having an inside diameter of 20 mm and a length of 320 mm and packed with 0.5 percent Pd-on-carbon catalyst of 2 – 3 mm particle size, was held at a temperature of 110° C by means of steam. At the same time, hydrogen was being introduced into this reactor at the rate of 50 cc per minute from its bottom.

The molten BHET and hydrogen coming out from the top of the reactor were separated into liquid and gas, and the BHET was continuously withdrawn into a receptacle, followed by cooling and molding by means of a flaker. The so obtained hydrogenation treated BHET, upon analysis, contained 100 ppm of HE–4CBA and 3,060 ppm of HE–PTA and its O.D. was 0.156. Next, 28 parts of this hydrogenated BHET and 100 parts of benzene were charged to a stainless steel 10 - liter vessel, the pressure was built up to 1 kg/cm² gauge with nitrogen and the reaction mixture was heated at 120° C for 30 minutes with stirring. When it was confirmed that the BHET had been dissolved completely by inspecting it through an inspection window at an operating pressure of 3.0 kg/cm² gauge, the dissolved BHET was continuously introduced into a stirrer-equipped 500 cc crystallization tank held at normal pressure and 80° C. The slurry formed was intermittently withdrawn from the crystallization tank and separation of the solid from the liquid was carried out followed by washing the solids portion in benzene to obtain white flaky purified BHET.

The results obtained upon analysis are shown in the following table. As a control, the quality of the product obtained when the crystallization was conducted without carrying out the hydrogenation treatment is also shown in the table.

| Experiment | Purification Method | HE–4CBA (ppm) | HE–PTA (ppm) | O.D. | Remarks |
|---|---|---|---|---|---|
| Ex. 1 | invention method | <10 | 75.3 | 0.092 | acid value 0.03 KOH mg/g of BHET DEG 0.05 wt. % |
| Con. 1 | crystallized without hydrogenation treatment | 289 | 25.1 | 0.157 | |

0.03 mol percent of antimony trioxide was added to the purified BHET obtained as hereinabove described in Example 1, and after purging with nitrogen, the mixture was placed in a 285° C bath and held there for 30 minutes at normal pressure, and thereafter the pressure was gradually reduced over a 30-minute period. When the pressure reached below 0.3 mm Hg, the polymerization reaction was carried out for one hour under this state. The state of vacuum was terminated with nitrogen after 2 hours had elapsed from the time the BHET was placed in the bath, followed by cooling to obtain a polymer. The properties of the so obtained polymer are shown below, indicating that the quality was very satisfactory.

| [$\eta$] | 0.653 | | |
|---|---|---|---|
| Softening point | 262.6° C | | |
| Color | L:86.0 | a: −0.7 | b: −4.2 |

The [$\eta$], as here used, is the intrinsic viscosity as measured by an Ostwald's viscometer in ortho-chlorophenol solvent at 35° C, and L, a, b of color are the readings of the color difference meter in accordance with ASTM 1482–57T.

On the other hand, the measurement of the content of HE–4CBA (abbreviation of the ethylene glycol ester of 4-carboxy- benzaldehyde) in the example is conducted by the polarographic technique, and the indication <10 ppm denotes that the value is below the quantitatively measurable limit. The content of HE–PTA (abbreviation of the ethylene glycol ester of p-toluic acid) is quantitatively analyzed by gas chromatography, and the O.D. value is the optical density, which is measured by dissolving 5.0 grams of BHET in 25 ml of pyridine and making the determination at a wavelength of 340 $\mu$ with a cell length of 5 cm.

$\phi$-DEG (adduct of BHET and ethylene glycol or ethylene oxide) is boiled in 20 percent aqueous methanol solution to decompose the ether bond and quantitatively analyzed by gas chromatography in the form of diethylene glycol. The acid value is obtained by dissolving BHET in pyridine and titrating for its acidity with aqueous alcoholic potash solution.

EXAMPLE 2

166 parts of terephthalic acid prepared by the air oxidation of p-xylene in the liquid phase, 100 parts of ethylene oxide and 1.7 parts of triethylamine benzyl chloride were charged to a stainless steel autoclave and, after purging with nitrogen, heated for one hour at 120° C with stirring. After completion of the reaction, the valve at the top of the autoclave was opened, and 30 parts of the unreacted ethylene oxide were recovered by means of a brine-cooled condenser. This was followed by delivering the molten reaction product by means of nitrogen pressure to a filter held at a temperature equal to that used in the reaction to separate the unreacted terephthalic acid remaining suspended in the molten reaction product to obtain 202 parts of crude BHET. The contents of HE–4CBA and HE–PTA in the so obtained crude BHET were 5,600 ppm and 820 ppm, respectively.

One hundred parts of the so obtained crude BHET and 1.5 parts of 0.5 percent platinum-on-alumina catalyst were charged to a Paal's contact reducing apparatus and, after purging with hydrogen, treated at normal pressure for 30 minutes at 120° C with shaking, after which the catalyst was separated while the reaction mixture was still in its molten state.

The contents of HE–4CBA and HE–PTA in the so obtained BHET were 107 ppm and 5,910 ppm, respectively.

Twenty parts of the hydrogenation treated BHET prepared in a large amount as hereinabove described and 80 parts of mixed xylene were charged to a stainless steel 10-liter vessel, as used in Example 1, and heated with a nitrogen pressure of 1 kg/cm$^2$ gauge for 30 minutes at 160° C. After confirming that the BHET was completely dissolved, the solution was continuously charged to a crystallization tank. The crystallization tank, which was identical to that used in Example 1, was jacketed 500 cc stainless steel tank, which was maintained at normal pressure and 60° C with hot water. A slurry was withdrawn intermittently from this crystallization tank, and the solids portion was separated from the liquid, followed by washing the solids portion in xylene to obtain purified BHET. The contents of HE–4CBA and HE–PTA in the purified BHET were <10 ppm and 116 ppm, respectively, and the O.D. of the purified BHET was 0.092.

EXAMPLE 3

166 parts of terephthalic acid prepared by the air oxidation of p-xylene, 88 parts of ethylene oxide and 1.8 parts of triethylamine benzyl chloride were charged to a stainless steel autoclave and, after purging with nitrogen, the pressure was built up with nitrogen to 10 kg/cm$^2$ gauge and the contents of the autoclave were heated for 1.5 hours at 120° C with stirring. After completion of the reaction, the valve at the top of the autoclave was opened, but no unreacted ethylene oxide was distilled off at all from the brine-cooled condenser.

Next, the pressure of the system was reduced to normal and the molten reaction mixture in its molten state was delivered at the rate of 5.0 parts per minutes to a reactor having an inside diameter of 20 mm and a tube length of 1 meter, which was held at normal pressure and 110° C. The reactor had 0.5 percent Pt-on-carbon catalyst of particle size 2 mm packed therein. The molten BHET and hydrogen gas were introduced from the bottom of this reactor. The molten BHET discharged from the top of the reactor, after separation of hydrogen, was flowed into a mixer held at normal pressure and room temperature, into which was being introduced toluene at the rate of 25 parts per minute.

The slurry of BHET formed in the mixer was delivered at the rate of 30 parts per minute by means of a pump to a double pipe type heat exchanger which was being heated with 3 kg/cm$^2$ gauge steam, and the BHET was completely dissolved. An intermediate tank whose pressure was adjusted to 4 kg/cm$^2$ gauge with nitrogen was disposed at the outlet of the heat exchanger. The solution was withdrawn intermittently via this intermediate tank into a liquid of a crystallization tank held at normal pressure and 40° C. The so crystallized slurry was withdrawn from the crystallization tank and, after separation, the BHET was further washed in toluene to obtain purified BHET.

The purified BHET, upon analysis, contained <10 ppm of HE–4CBA and its O.D. was 0.097.

EXAMPLES 4 – 5

A reaction mixture synthesized exactly as in Example 1, after leaving the tube type reactor, was passed via an intermediate tank whose pressure was adjusted to 20 kg/cm² gauge through a filter maintained at 2 kg/cm² gauge and 120° C to separate the unreacted terephthalic acid and withdrawn into an agitating tank held at normal pressure and 30° C. The reaction mixture prepared in this manner was charged to a stainless steel 10-liter vessel identical to that used in Example 1 along with a catalyst indicated in the following table. After thorough purging with nitrogen, the vessel was swept out several times with hydrogen, and thereafter the hydrogen pressure was first built up to 3 kg/cm² gauge, followed by stirring for 1 hour at 120° C (the operating pressure was 5 kg/cm² gauge). This was followed by separating the catalyst by passing the reaction mixture through a filter maintained at the same temperature and pressure. The so obtained solution was continuously charged to the liquid phase portion of a 500 cc crystallization tank held at normal pressure and 81° C. The resulting slurry was treated exactly as in Example 1 to obtain white purified BHET.

| Ex. | Class of catalyst | Amount added of catalyst (wt. percent based on BHET) | HE-4CBA content of purified BHET (p.p.m.) | O.D |
| --- | --- | --- | --- | --- |
| 4 | Raney nickel (powder) | 0.50 | <10 | 0.092 |
| 5 | Raney cobalt (4-6 mm. particles) | 0.50 | 15 | 0.088 |
| 6 | Rhenium black (powder) | 0.11 | <10 | 0.095 |
| 7 | Ruthenium on alumina (powder) | 1.0 | <10 | 0.101 |
| 8 | Reduced nickel (3-5 mm. particles) | 2.0 | <10 | 0.097 |
| 9 | Palladium on alumina (powder) | 0.6 | <10 | 0.089 |
| 10 | Rhodium on diatomaceous earth (powder) | 0.1 | <10 | 0.089 |

EXAMPLES 11 – 13

Thirty parts of the crude BHET prepared in Example 1 and 0.15 parts of Raney nickel powder were charged to a Paal's contact reducing apparatus and, after thorough purging with hydrogen, were shaken for 30 minutes under normal pressure at the temperature indicated in the following table. Next, while still in a molten state, the catalyst was separated from the mixture, after which crystallization was carried out by operating exactly as in Example 1 to obtain purified BHET whose quality was as follows:

| Example | Hydrogenation treatment temperature (° C.) | HE-4CBA content of purified BHET (p.p.m.) | O.D. |
| --- | --- | --- | --- |
| 11 | 130 | 10 | 0.092 |
| 12 | 150 | 10 | 0.090 |
| 13 | 170 | 10 | 0.089 |

EXAMPLES 14 – 15

Six parts of crude BHET prepared in Example 1, 100 parts of toluene and 0.06 parts of reduced cobalt powder were charged to a Paal's contact reactor and, after purging the reactor with hydrogen, followed by separation of the catalyst while hot, the resulting solution was cooled to room temperature and the BHET separated and dried.

Next, 20 parts of the hydrogenation treated BHET prepared in a large amount as hereinabove described and 100 parts of benzene were charged to a 10-liter vessel identical to that used in Example 1, after which the pressure of the vessel was built up to 1 kg/cm² gauge with carbon dioxide and the mixture was heated to 115° C with stirring. After confirming that the BHET was completely melted, the melt was continuously charged to a crystallization tank, followed by treating exactly as in Example 1 to obtain purified BHET.

The foregoing hydrogenation treatment was also carried out in same manner except that 120 parts of xylene were used instead of the toluene solvent. These results are also presented in the following table.

| Example | Hydrogenation Treatment Solvent | HE-4CBA Content of Purified BHET | O.D. |
| --- | --- | --- | --- |
| 14 | toluene | <10 | 0.101 |
| 15 | xylene | <10 | 0.908 |

EXAMPLE 16

To 144 parts of a reaction mixture prepared as in Example 4 were further added 144 parts of benzene. The so obtained mixture was charged along with 0.5 parts of reduced nickel catalyst to a stainless steel 10-liter vessel identical to that used in Example 4, followed by first building the pressure of the vessel up to 1.5 kg/cm² gauge with nitrogen and thereafter introducing hydrogen up to a pressure of 3 kg/cm² gauge. After the inside of the vessel was purged by repeating this operation three times, nitrogen up to a pressure of 1.5 kg/cm² gauge followed by hydrogen up to a pressure of 3.0 kg/cm² were introduced, after which heating was carried out for 30 minutes at 110° C with stirring. This was followed by raising the internal temperature to 115° C and then passing the reaction mixture through a filter maintained at the same temperature and pressure to separate the catalyst, followed by introducing the resulting solution continuously into the liquid phase portion of a 500 cc crystallization tank held at normal atmospheric pressure and 80° C. The resulting slurry was treated exactly as in Example 1 to obtain purified BHET. Upon analysis, the content of HE–4CBA was <10 ppm and the O.D. was 0.089.

EXAMPLE 17

Twenty parts of crude BHET prepared as in Example 1 and 0.2 parts of nickel-diatomaceous earth catalyst were charged to a stainless steel autoclave. After thorough purging of the autoclave with hydrogen, its pressure was built up to 10 kg/cm² gauge with hydrogen and stirring of the mixture was carried out for 10 minutes at 150° C. After completion of the hydrogenation treatment, the temperature of the mixture was cooled to 120° C, followed by cooling and molding with a flaker. Next, 20 parts of this hydrogenation treated BHET and 100 parts of benzene were charged to a 10-liter stainless steel vessel identical to that used in Example 1 and heated at 120° C for 5 minutes with stirring. Since it was confirmed that the BHET had completely dissolved, the solution was introduced to the vapor phase portion of an agitator-equipped 500 cc crystallization tank held at normal atmospheric pressure and 80° C, followed by withdrawing a slurry continuously from said tank. The solids portion of the resulting slurry was separated from the liquid and the solids portion was washed in benzene to obtain pure BHET. Upon analysis, the HE–4CBA content was <10 ppm and the O.D. was 0.090.

EXAMPLE 18 AND CONTROL 2

1. Twenty parts of crude BHET prepared as in Example 1 and 100 parts of benzene were charged to a stainless steel 10-liter vessel identical to that used in Example 1. The pressure was built up to 1 kg/cm² gauge with nitrogen and the mixture was stirred for 5 minutes at 120° C. After confirming that the BHET had completely dissolved, the solution was introduced to the liquid phase portion of an agitator-equipped 500 cc crystallization tank held at 80° C and normal pressure, from where the resulting slurry was intermittently withdrawn and a filtrate was obtained by separation of the solids portion.
2. The filtrate obtained in 1, above, which contains 544 ppm of HE–4CBA, was fed at the rate of 10 parts per minute to a catalyst-packed reactor held at normal pressure and 81°

C. The reactor whose inside diameter was 20 mm and tube length was 1,000 mm was packed with 32-mesh 5 percent palladium-on-carbon catalyst and was being introduced with hydrogen at the rate of 20 cc per minute.

A hydrogenation treated filtrate whose content of HE-4CBA was <10 ppm was thus obtained.

3. Twenty parts of the crude BHET of Example 1 and 100 parts of the hydrogenation treated filtrate obtained in (2), above, were charged to a stainless steel 10-liter vessel identical to that used in (1), above, and by operating exactly as in (1), above, a crystallized slurry was obtained, whose solids portion was separated from the liquid and washed further in benzene to obtain purified BHET. Upon analysis, the results were as indicated in the following table.

4. The crystallized BHET obtained by charging 100 parts of the filtrate obtained in (1) above, which contained HE-4CBA, and 20 parts of the crude BHET of Example 1 to a stainless steel 10-liter vessel, followed by operating exactly as in (3), above, when analyzed, yielded the following results.

| Experiment | Class of filtrate used for crystallization | HE-4CBA content of purified BHET (p.p.m.) | O.D. of purified BHET |
|---|---|---|---|
| Example 18 | Hydrogenation treated filtrate | <10 | 0.088 |
| Control 2 | Untreated filtrate | 456 | 0.132 |

EXAMPLE 19

The benzene-containing crystallization BHET prepared as in (1) of Example 18 was heated to 115° C and the evaporating benzene was withdrawn externally of the system and recovered by condensing with a condenser. On the other hand, the molten BHET containing some benzene was introduced at the rate of 10 parts per minute to a reactor packed with Raney cobalt catalyst of 2 - 2.5 mm particle size. The reactor whose inside diameter was 20 mm and tube length was 1,000 mm was held at 120° C and normal pressure and purged with hydrogen.

The molten BHET leaving the reactor was delivered to a flaker where it was cooled and molded to obtain purified BHET whose contents of HE-4CBA and HE-PTA were <10 ppm and 293 ppm, respectively, and whose O.D. was 0.081.

Further, the polymer obtained from the foregoing BHET had a satisfactory quality as indicated below.

| [η] | 0.661 | | |
|---|---|---|---|
| Softening point | 262.7° C | | |
| Color | L:87.0 | a: −0.3 | b: −4.7 |

EXAMPLE 20 AND CONTROL 3

A slurry of 28 parts of the crude BHET prepared in Example 1 and 100 parts of benzene was continuously introduced to a double pipe type heat exchanger and dissolved. The jacket of the heat exchanger was heated with steam of 3 kg/cm² gauge and the temperature at the outlet of the tube was 125° C. The resulting solution was introduced via an intermediate tank held at 4 kg/cm² gauge by means of nitrogen pressure, into the liquid phase portion of a crystallization tank maintained at normal pressure and 80° C. The resulting slurry was continuously conveyed to a centrifuge to separate the solids portion from the liquid, after which the benzene-containing solids portion was continuously fed to a melting dryer of the following description.

The melting dryer consists of an externally circulating type tank held at 100 mm Hg and 120° C, wherein the molten BHET is externally circulated by means of a pump. At the suction side of the pump a heat exchanger was dispersed for carrying out the heating and at the discharge side of the pump a packed column containing granular 0.5 percent palladium-on-carbon catalyst was dispersed. The average dwell time of the BHET in the tank was 10 hours. The evaporated benzene was withdrawn to a vacuum chamber and recovered while, on the other hand, the dried BHET from which the benzene had been completely driven out was continuously withdrawn from the outlet side of catalyst packed column disposed next to the pump. The withdrawn BHET, after passing through a filter, was cooled and molded by a flaker to yield purified BHET.

Along with the analytic results of the foregoing purified BHET are also shown below the analytic results of BHET which was melt-dried without being passed through a catalyst packed column to be submitted to the hydrogenation treatment.

| Experiment | Purification method | HE-4CBA content (p.p.m.) | O.D. |
|---|---|---|---|
| Example 20 | Hydrogenation treated melt-dried BHET. | <10 | 0.089 |
| Control 3 | Melt-dried BHET not receiving hydrogenation treatment. | 298 | 0.159 |

What is claimed is:

1. A process for the purification of crude bis-($\beta$-hydroxyethyl) terephthalate by crystallization comprising homogeneously dissolving crude bis-($\beta$-hydroxyethyl) terephthalate in a solvent comprising an aromatic compound which is liquid at room temperature, at a temperature higher than the apparent melting point of said crude bis-($\beta$-hydroxyethyl) terephthalate in said solvent, at a concentration higher than the saturation solubility of said crude bis-($\beta$-hydroxyethyl) terephthalate in said solvent at said apparent melting point to prepare a heated solution; rapidly cooling said heated solution to a temperature lower than said apparent melting point to precipitate said bis-($\beta$-hydroxyethyl) terephthalate from said heated solution as solids other than of a granular or lumpy form; and thereafter separating the precipitated bis-($\beta$-hydroxyethyl) terephthalate, said process being characterized in that said crude bis-($\beta$-hydroxyethyl) terephthalate or said crystallized bis-($\beta$-hydroxyethyl) terephthalate is contacted with hydrogen in the presence of a hydrogenation catalyst having the ability to reduce an aldehyde group to a hydroxymethyl or methyl group before, after, or both before and after said precipitation step, when the bis-($\beta$-hydroxyethyl) terephthalate is either in molten form, or in dissolution or dispersion in said solvent or other inert liquid medium.

2. The process of claim 1 wherein said crude bis-($\beta$-hydroxyethyl) terephthalate, in its molten state is contacted with hydrogen in the presence of said hydrogenation catalyst.

3. The process of claim 1 wherein said crude bis-($\beta$-hydroxyethyl) terephthalate is contacted with hydrogen in the presence of said hydrogenation catalyst in a state wherein said crude bis-($\beta$-hydroxyethyl) terephthalate is in dissolution in an inert liquid medium, in dispersion in said liquid medium in its molten form or both in dissolution in an inert liquid medium and in dispersion in said liquid medium in its molten form.

4. The process according to claim 3 wherein said inert liquid media is an aromatic compound which is liquid at room temperature.

5. The process of claim 1 wherein the medium used at the time the crude bis-($\beta$-hydroxyethyl) terephthalate or crystallized bis-($\beta$-hydroxyethyl) terephthalate is contacted with hydrogen in the presence of said hydrogenation catalyst is an aromatic compound identical to that used in said purification process by crystallization, said compound being one which is liquid at room temperature.

6. The process according to claim 1 wherein said aromatic compound, which is liquid at room temperature, is at least one compound selected from the group consisting of benzene, toluene, and xylene.

7. The process according to claim 1 wherein said hydrogenation catalyst is at least one metal selected from the group consisting of platinum, palladium, rhodium, ruthenium, nickel and cobalt.

* * * * *